April 2, 1968     A. TSCHURSCH     3,376,008

MOVABLE VEHICLE SEAT

Filed Dec. 2, 1966

Inventor:
ARNOLD TSCHURSCH
BY Thomas J. Golen
ATTORNEY

United States Patent Office 3,376,008
Patented Apr. 2, 1968

3,376,008
MOVABLE VEHICLE SEAT
Arnold Tschursch, Bruckmuhl-Hinrichsegen, Germany, assignor to Georg Fritzmeier KG., Grosshelfendorf uber Munich, Germany
Filed Dec. 2, 1966, Ser. No. 598,810
Claims priority, application Germany, Dec. 6, 1965, F 47,849
6 Claims. (Cl. 248—376)

This invention relates generally to a vehicle seat that may be moved from a first lower to a second upper or rearward position and vice versa. In particular, this invention is concerned with movable seats for agricultural vehicles.

In vehicles, in particular agricultural vehicles, frequently space in the vicinity of the seat is short and less than actually needed for convenient action of an operator. Especially, in certain circumstances, and chiefly in vehicles of the agricultural type it is desired, that a person may operate such vehicle in a seated as well as in a standing position.

It is therefore a primary object of this invention to provide a seat for a vehicle that may easily be moved from a normal position corresponding to the seated position of the user into a backward position, so that additional room is obtained in front of the seat allowing a person to assume a standing position or making it more convenient to the user to enter the vehicle where there is not sufficient space, as for instance in combined harvesters, so that the seat must be lifted in an upward direction.

It is another important object of this invention to provide connecting means for linking a seating member of the vehicle seat to a support means so that the seating member may be moved pivotally with respect to the support means.

It is a further object of this invention to couple the said seating member to the said connecting means in a resilient manner when the seating member is in its normal position.

A further object of this invention is to connect the seating member and the support means in such a manner that relative movement thereof takes place without inconvenient shocks.

Figure 1:
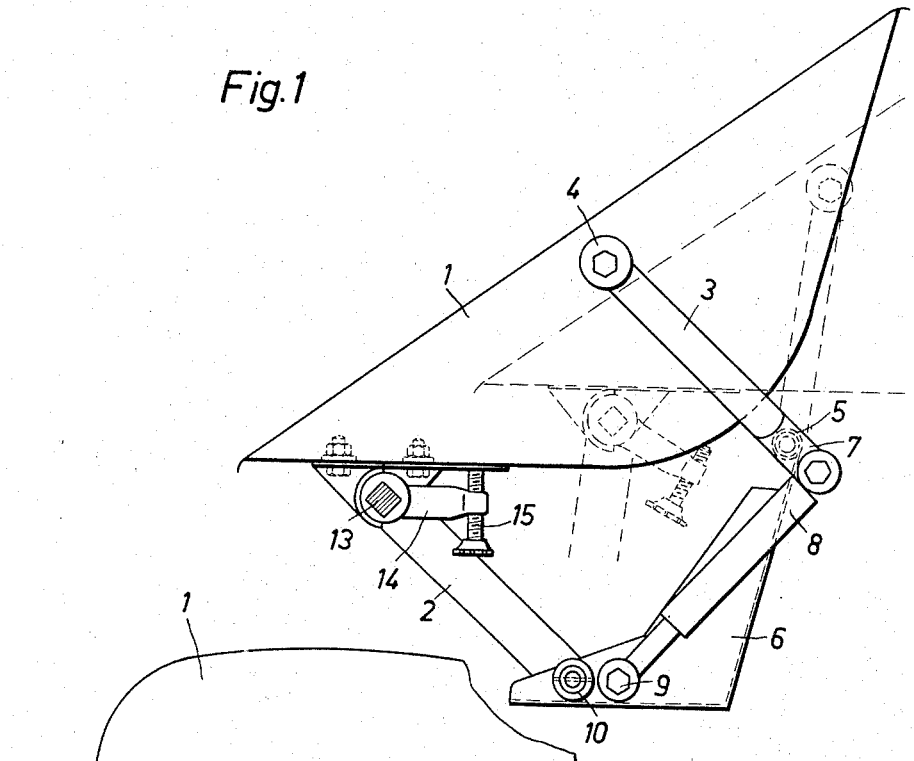
Figure 2:
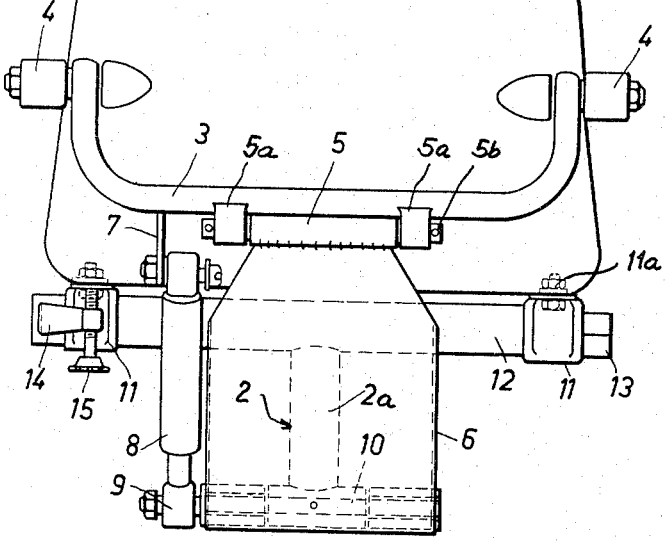

Further objects and advantages of this invention will become apparent in connection with the following description of a preferred embodiment of this invention and with reference to the accompanying drawings, wherein:

FIG. 1 is a side elevational view of a vehicle seat according to this invention and FIG. 2 is an elevational view of the rear of the seat shown in FIG. 1.

Referring now to the drawings, in FIGS. 1 and 2 a bowl-like shaped seating member of the vehicle seat of this invention is designated with reference numeral 1. A lever 2 and a linkage member 3 extending substantially parallel with each other serve to pivotally connect seating member 1 in a parallelogram-like fashion to a support means 6 secured to the bottom of a vehicle in the mounted condition of the seat.

As evident from FIG. 2, in the present embodiment linkage member 3 is formed as a substantially U-shaped frame having lateral legs that are pivotally connected at their ends to opposite sides of seating member 1 in conjunction with rollers 4. In its portion extending between the two lateral legs linkage member 3 is provided with two eyes 5a receiving between each other a tube section 5 fastened to the upper portion of support means 6. An axis 5b penetrates both the eyes 5a and the tube section 5 to provide for a hinge-like connection between linkage member 3 and support means 6.

Support means 6 is of U-like cross section and has a substantially L-shaped configuration with one leg extending in a horizontal and the other one in a vertical direction.

As illustrated partly in dashed lines in FIG. 2, lever 2 is composed of a radial section 2a and a first axial portion 10 as well as a second axial tubular portion 12. The first axial portion 10 is pivotally mounted to the forward end of the horizontal leg of support means 6, whereas second axial portion 12 is held rotatably with respect to seating member 1 by means of bridge members 11 secured to seating member 1 by means of bolts 11a and serving there as bearings for the tubular portion 12.

The axial tubular portion 12 extends underneath of seating member 1 in a direction substantially perpendicular to the longitudinal axis of seating member 1. A torsion bar 13 of substantially square cross section is surrounded by tubular portion 12. One end of torsion bar 13 is coupled to tubular portion 12 in such a manner that no rotational movement between these two parts is possible at the coupling point. The opposite end of torsion bar 13 protrudes beyond tubular portion 12 and is inserted into a suitable opening of a bracket member 14 so that this bracket member 14 likewise is connected to bar 13 in a non-rotatable manner. Bracket member 14 which extends radially with regard to torsion bar 13 is provided at its outer end with a threaded bolt 15 adjustable in height and engaging the reinforced lower surface of seating member 1 with its upper end.

Due to this construction bracket member 14 in connection with bolt 15 will serve as an abutment means when seating member 1 is in its lower, normal position. Any downward movement acting upon seating member 1 is transferred through bolt 15 and bracket member 14 to torsion bar 13 which then provides for resilient movement of seating member 1 with respect to lever 2.

However, if additional room is needed in the front area of seating member 1, seating member 1 may be moved in clockwise direction into a second rearward position as indicated in dashed lines in FIG. 1, since lever 2 as well as linkage member 3 may be moved about their lower and upper pivoting points. The actual position then assumed by seating member 1 will basically depend upon the effective length of linkage member relative to lever 2. Preferably, the distance between the centers of first and second axial portions 10 and 12 is equal to or shorter than the distance (as seen in FIG. 1) between the centers of rollers 4 and tube section 5. It will be understood that during this movement from the lower condition to the upper one (and vice versa) bracket member 14 and bolt 15 as well as torsion bar 13 remain without influence. Only when seating member 1 is returned to its lower condition will bolt 15 engage with the reinforced lower surface of seating member 1 and prevent seating member 1 from further free movement in a downward direction.

As shown in FIG. 2, a protrusion 7 may radially extend from linkage member 3. The free end of protrusion 7 is connected to one end of a shock-absorber 8 the second end of which is secured by a bolt 9 to the lower portion or horizontal leg of supporting means 6. Thus, smooth movement of seating member 1 with respect to support means 6 is enabled and the user is protected from unpleasant and violent shocks or the like.

It will be appreciated that variations in relative dimensions or arrangement of parts may occur to one skilled in the art without departing from the scope of this invention. What it is desired to be secured by Letters Patent of the United States is:

1. A vehicle seat including support means, a seating member and means movably to connect said seating member to said support means, said connecting means comprising a lever pivotally mounted at its one end to the lower end of said support means and at its other end to a lower portion of said seating member, a linkage member pivotally mounted at its one end to the upper end of said support means and at its other end to an upper portion of said seating member, said linkage member extending substantially in parallel to said lever at least when said seating member is in a lower first position, spring means fixedly coupled at its one end to said other end of said lever and abutment means fixedly mounted to the other end of said spring means for engagement with said seating member to prevent free downward movement thereof with respect to said lever in said lower first position but to permit free upward movement of said seating member.

2. The vehicle seat of claim 1, wherein the effective length of said lever is shorter than that of said linkage member.

3. The vehicle seat of claim 1, wherein the effective length of said lever is equal to that of said linkage member so that the seat may be raised to a parallel position.

4. The vehicle seat of claim 1, wherein said support means is of L-shape with one horizontal and one vertical portion, and of U-shaped cross section.

5. The vehicle seat of claim 1, wherein said linkage member is provided with a protrusion extending beyond the pivot point at which said one end of said linkage member is connected to said support means, a shock absorbing means at its ends pivotally interconnected between said protrusion and a lower portion of said support means.

6. The vehicle seat of claim 1, wherein said lever has an axial tubular portion extending underneath said seating member in a direction transverse to the longitudinal axis of said seating member and rotatably mounted to said seating member, said spring means formed by a torsion bar received by said tubular portion and fixedly connected at its one end to said tubular portion, said abutment means formed by a bracket member connected radially to the other end of said torsion bar and by a bolt extending in a direction transverse with respect to the longitudinal axis of said bracket member and engaging the lower surface of said seating member when in its lower first position.

References Cited

UNITED STATES PATENTS

| | | | |
|---|---|---|---|
| 2,815,064 | 12/1957 | Witzel | 248—376 |
| 2,840,140 | 6/1958 | Harrington | 248—376 |
| 2,894,563 | 7/1959 | Simons et al. | 248—376 XR |
| 3,006,593 | 10/1961 | Plate, et al. | 248—376 |
| 3,031,164 | 4/1962 | Schopf | 248—373 |
| 3,185,429 | 5/1965 | Meinhardt | 248—373 |

BOBBY R. GAY, *Primary Examiner.*

G. O. FINCH, *Assistant Examiner.*